(12) United States Patent
Saito

(10) Patent No.: US 6,751,466 B1
(45) Date of Patent: Jun. 15, 2004

(54) RADIO COMMUNICATION APPARATUS

(75) Inventor: Yoshiko Saito, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,838

(22) PCT Filed: Jan. 25, 2000

(86) PCT No.: PCT/JP00/00336
§ 371 (c)(1),
(2), (4) Date: Sep. 22, 2000

(87) PCT Pub. No.: WO00/44109
PCT Pub. Date: Jul. 27, 2000

(30) Foreign Application Priority Data

Jan. 25, 1999 (JP) .............................. 11-015759

(51) Int. Cl.⁷ ................................. H04B 7/00
(52) U.S. Cl. ........................ 455/514; 455/69; 455/420
(58) Field of Search ................ 455/69, 67.6, 67.1, 455/514, 418, 419, 420; 370/508, 519

(56) References Cited

U.S. PATENT DOCUMENTS

| | | | | |
|---|---|---|---|---|
| 4,933,935 A | * | 6/1990 | Adams | 370/406 |
| 5,457,811 A | * | 10/1995 | Lemson | 455/67.1 |
| 5,537,414 A | * | 7/1996 | Takiyasu et al. | 370/347 |
| 5,603,093 A | * | 2/1997 | Yoshimi et al. | 455/63 |
| 5,748,621 A | * | 5/1998 | Masuda et al. | 370/337 |
| 5,959,984 A | * | 9/1999 | Dent | 370/347 |
| 6,028,845 A | | 2/2000 | Serikawa et al. | |
| 6,219,561 B1 | * | 4/2001 | Raleigh | 455/561 |
| 6,295,289 B1 | * | 9/2001 | Ionescu et al. | 370/342 |
| 6,388,997 B1 | * | 5/2002 | Scott | 370/280 |
| 6,408,009 B1 | * | 6/2002 | Campbell et al. | 370/461 |
| 6,411,611 B1 | * | 6/2002 | van der Tuijn | 370/337 |
| 6,490,257 B1 | * | 12/2002 | Watanabe et al. | 370/318 |

FOREIGN PATENT DOCUMENTS

| | | |
|---|---|---|
| JP | 7095655 | 4/1995 |
| JP | 7264125 | 10/1995 |
| JP | 08008794 | 1/1996 |
| JP | 9233038 | 9/1997 |
| JP | 10164652 | 6/1998 |

* cited by examiner

Primary Examiner—Nay Maung
Assistant Examiner—Tan Trinh
(74) Attorney, Agent, or Firm—Stevens, Davis, Miller & Mosher, LLP (57) ABSTRACT

In the case where empty slot detection section 119 detects an empty transmission slot to which no user data to be transmitted is assigned in a transmission signal whose frame is composed by communication frame composition section 118, empty slot detection section 119 notifies timing control section 115 of the empty transmission slot, switches switch 121, transmits the UW created by UW frame composition section 120 to the other communication station and the other communication station estimates a propagation environment using this UW and performs pre-coding.

4 Claims, 11 Drawing Sheets

UL : UPLINK
DL : DOWNLINK

RADIO COMMUNICATION APPARATUS

TECHNICAL FIELD

The present invention relates to a radio communication apparatus, and more particularly, to a radio communication apparatus in a digital mobile communication.

BACKGROUND ART

As a transmission system in a mobile communication, Frequency Division Duplex (hereinafter referred to as "FDD") system and Time Division Duplex (hereinafter referred to as "TDD") system are two leading examples.

Figure 10A:
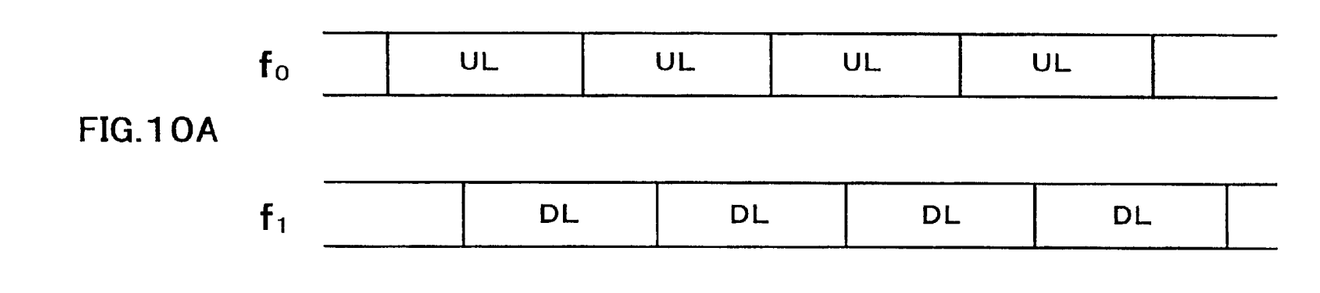
FIG. 10A is a schematic diagram showing a frame composition in an FDD-based radio communication.
Figure 10B:
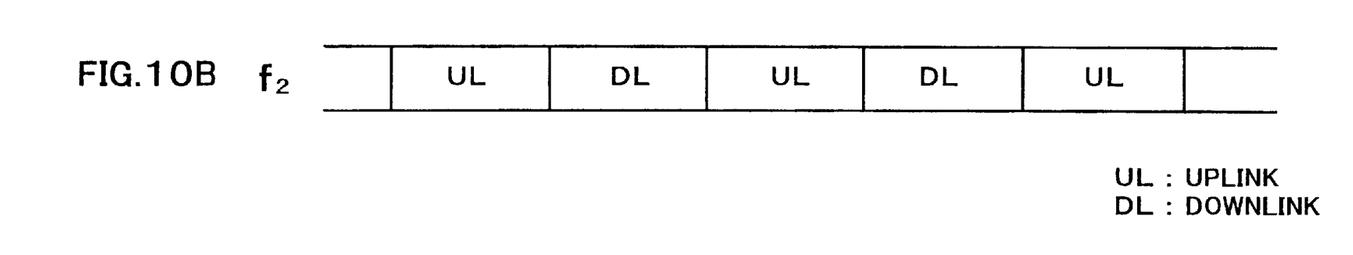
FIG. 10B is a schematic diagram showing a frame composition in a TDD-based radio communication.

The FDD system is a communication system that uses different frequency bands (here, f0 and f1) for the up link (hereinafter referred to as "UL") and down link (hereinafter referred to as "DL") as shown in FIG. 10A, while the TDD system is a communication system that uses a same frequency band (here f2) for UL and DL as shown in FIG. 10B.

As a mobile communication, the TDD system, which uses fewer frequencies per channel, is currently considered to be a more promising system.

By the way, mobile communications are becoming increasingly faster with each passing day and a unit time (hereinafter referred to as "slot") used for UL and DL in the TDD system tends to be shortened. For example, in the case where a transmission rate of 200 kbps is sped up to 20 Mbps, the time required to transmit a same amount of information is reduced to $\frac{1}{100}$.

Since UL and DL use a same frequency in the TDD system, UL and DL have a same propagation environment that influences on them and in the case where the distance between UL and DL, that is, a one-slot length is very short, it is possible to assume that the propagation environment characteristic will not change between UL and DL. In this case, during transmission from a base station apparatus to a mobile station apparatus over DL, the base station apparatus can multiply an inverse characteristic of the propagation environment estimated during reception from the mobile station apparatus beforehand instead of ordinary equalization processing, thereby compensating influences from the propagation environment.

Using this method called "pre-coding", it is not necessary for the mobile station apparatus to compensate influences from the propagation environment, making it possible to simplify and reduce the size of the mobile station apparatus.

Figure 11A:
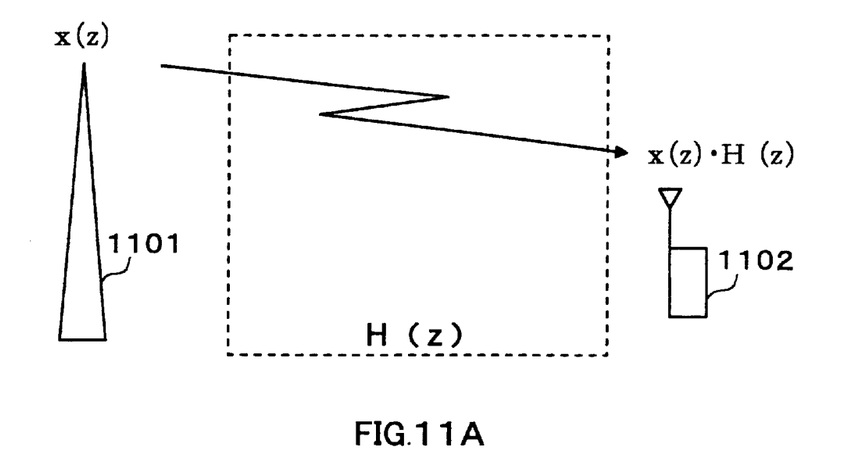
FIG. 11A is a schematic diagram of a base station apparatus and mobile station apparatus carrying out a radio communication without pre-coding.
Figure 11B:
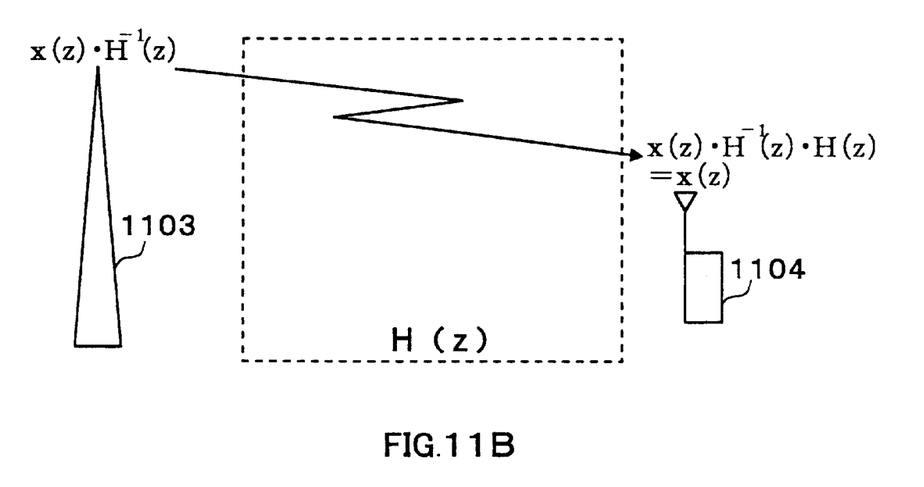
FIG. 11B is a schematic diagram of a base station apparatus and mobile station apparatus carrying out a radio communication with pre-coding.

The pre-coding will be explained in detail with reference to FIG. 11 below. FIG. 11 is a schematic diagram of a base station apparatus and mobile station apparatus that carry out a radio communication to explain the pre-coding.

In FIG. 11, suppose the propagation environment characteristic can be expressed by H (z). That is, signal x(z), which is transmitted from base station apparatus 1101 through this propagation environment, is multiplied by H(z) resulting in x(z)·H(z) when the transmission signal arrives at mobile station apparatus 1102. Therefore, in a system that uses ordinary equalization processing, it is necessary to remove the H(z) component from the reception signal as shown in FIG. 11A.

Thus, base station apparatus 1103 performs pre-coding as shown in FIG. 11B. That is, when base station apparatus 1103 receives a signal from mobile station apparatus 1104, if base station apparatus 1103 estimates that the propagation environment characteristic is H(z), base station apparatus 1103 multiplies transmission signal x(z) by an inverse characteristic of the propagation environment $H^{-1}(z)$ beforehand and sends $x(z) \cdot H^{-1}(z)$ to mobile station apparatus 1104 right after the reception. Then, the signal that mobile station apparatus 1104 receives is $x(z) \cdot H^{-1}(z) \cdot H(z) = x(z)$, which eliminates the need for mobile station apparatus 1104 to compensate to remove influences of the propagation environment.

Thus, in the TDD system in which transmission slots and reception slots are provided alternately in a same frequency band, the base station apparatus uses a propagation environment estimated by using unique words (hereinafter referred to as "UW") included in the reception signal for pre-coding during next data transmission and thereby implements a radio communication without the need for the mobile station apparatus to compensate influences from the propagation environment and without being affected by the propagation environment.

However, the conventional base station apparatus has a problem of being unable to keep up with an ever-changing propagation environment.

That is, in the case of an asymmetric communication whose DL duration is longer than UL duration or in the case of a symmetric communication with a large interval of switching between UL and DL, once an empty slot is produced, the interval between the time of reception at which the propagation environment is estimated and the time of the next transmission at which the propagation environment information is applied to pre-coding will be extended, resulting in a problem that it is not possible to perform pre-coding according to a variation produced in the propagation environment in the meantime.

DISCLOSURE OF INVENTION

It is an object of the present invention to provide a radio communication apparatus carrying out pre-coding capable of keeping up with an ever-changing propagation environment in the case of an asymmetric communication whose DL duration is longer than UL duration or in the case of a symmetric communication with a large interval of switching between UL and DL.

A theme of the present invention is that in the case where an empty slot is produced with user data to be transmitted not assigned, the radio communication apparatus makes it possible to estimate the propagation environment by transmitting UW, a control channel signal, to the other end of communication using the empty transmission slot and by the other end of communication receiving this UW, thus carrying out accurate pre-coding in the case of an asymmetric communication whose DL duration is longer than UL duration or in the case of a symmetric communication with a large interval of switching between UL and DL.

BEST MODE FOR CARRYING OUT THE INVENTION

With reference now to the attached drawings, embodiment of the present invention will be explained in detail below.

(Embodiment 1)

This embodiment describes a case where when an empty transmission slot is produced with user data to be transmitted not assigned, UW is transmitted using this empty transmission slot.

Figure 1:
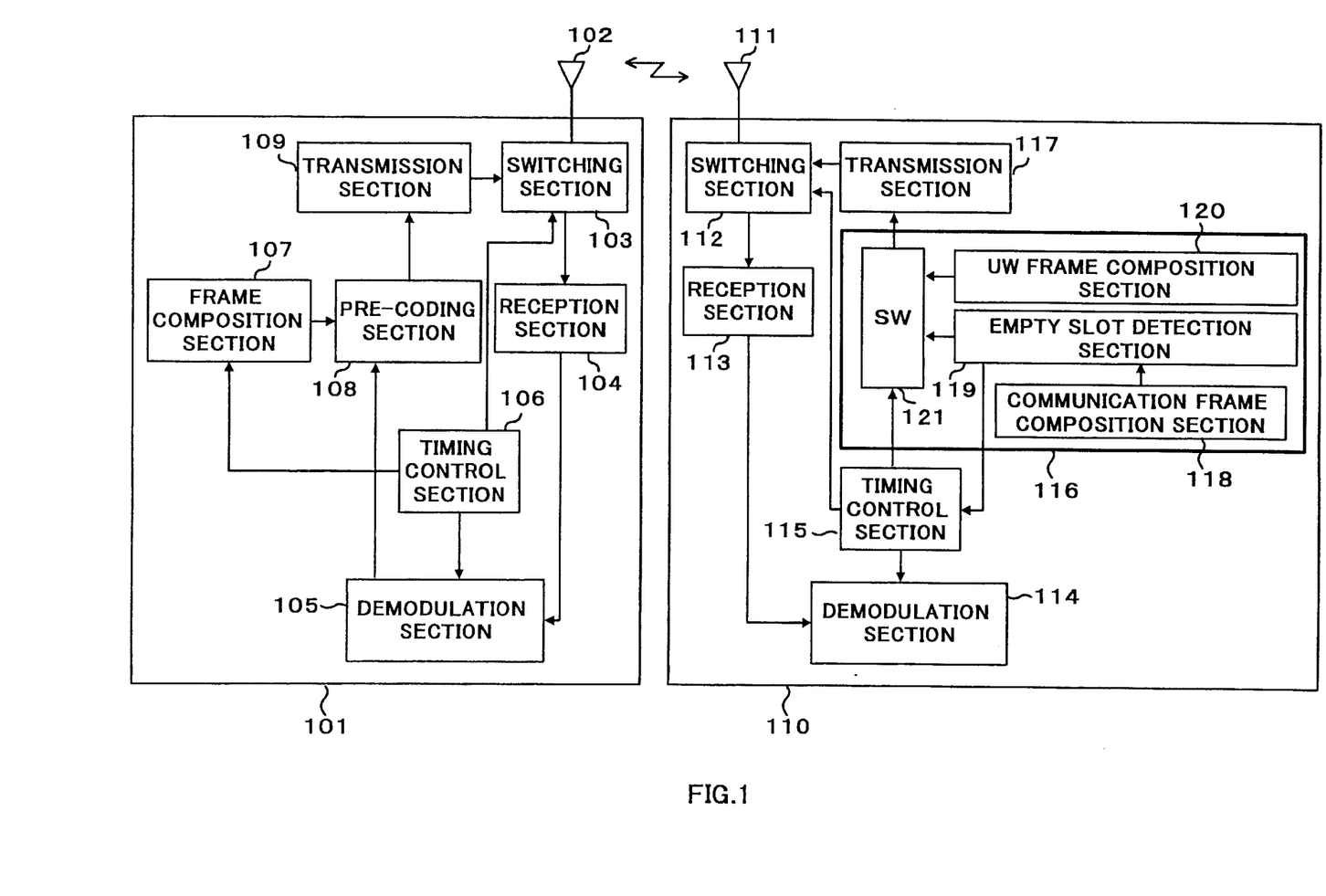
FIG. 1 is a block diagram showing an outlined configuration of a mobile station apparatus and base station apparatus according to Embodiment 1 of the present invention.
Figure 2A:
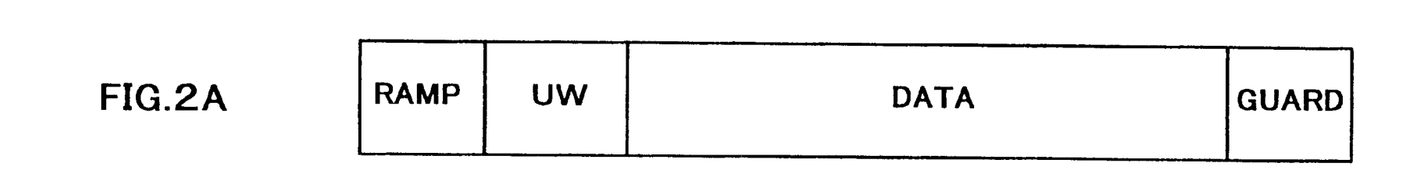
FIG. 2A is a schematic diagram showing a frame composition when user data is transmitted.
Figure 2B:
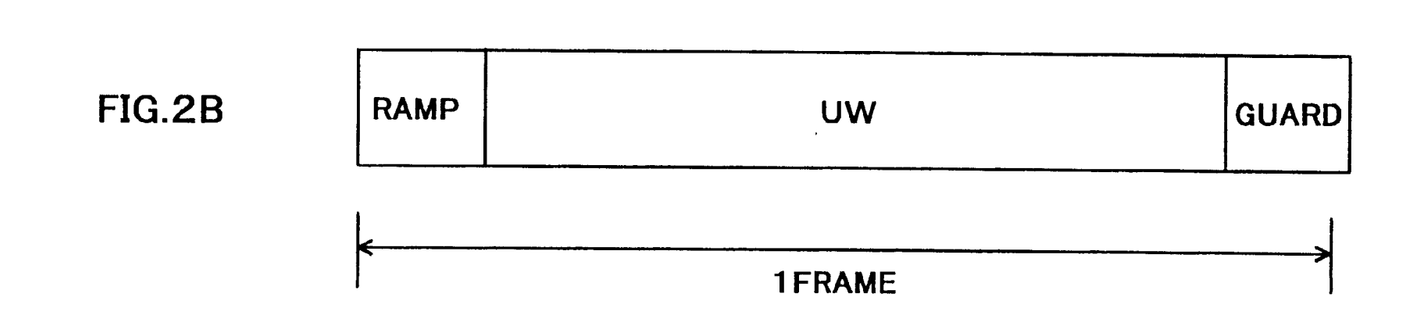
FIG. 2B is a schematic diagram showing a frame composition when UW is transmitted using an empty transmission slot.
Figure 3:
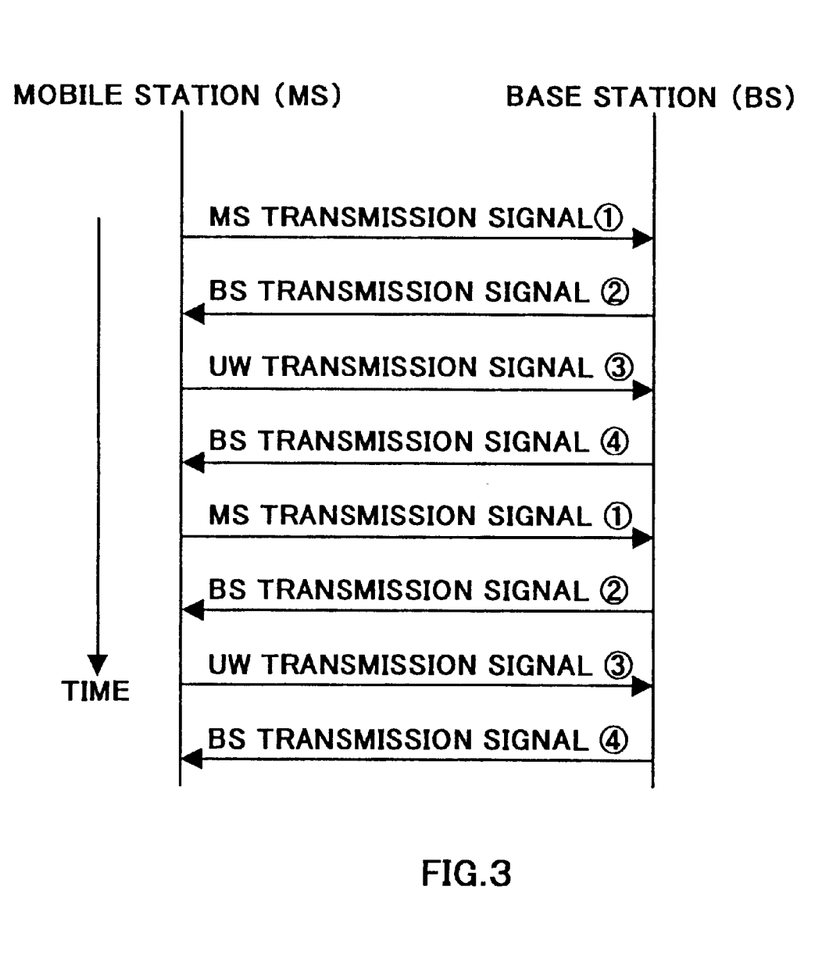
FIG. 3 is a schematic diagram showing a transmission/reception situation of a radio communication between a base station apparatus and mobile station apparatus.

The radio communication apparatus according to this embodiment will be explained using FIG. 1 to FIG. 3 below. FIG. 1 is a block diagram showing an outlined configuration of a mobile station apparatus and base station apparatus according to Embodiment 1 of the present invention, FIG. 2 are schematic diagrams showing a frame composition and FIG. 3 is a schematic diagram showing a transmission/reception situation of a radio communication between the base station apparatus and mobile station apparatus.

In FIG. 1, base station apparatus 101 comprises antenna 102, switching section 103 that divides a signal input/output to/from antenna 102 into a transmission system and a reception system, reception section 104 that performs reception processing such as quasi-coherent detection on the reception signal, demodulation section 105 that demodulates the reception signal, timing control section 106 that controls the switching timing of switching section 103, the demodulation timing of demodulation section 105 and the composition timing of frame composition section 107, which will be described later, frame composition section 107 that composes a frame of a transmission signal, pre-coding section 108 that performs pre-coding processing on the transmission signal and transmission section 109 that performs transmission processing such as quadrature modulation on the transmission signal.

Mobile station apparatus 110 comprises antenna 111, switching section 112 that divides a signal input/output to/from antenna 111 into a transmission system and a reception system, reception section 113 that performs reception processing such as quasi-coherent detection on the reception signal, demodulation section 114 that demodulates the reception signal, timing control section 115 that controls the switching timing of switching section 112, the demodulation timing of demodulation section 114 and the switching timing of switch (SW) 121, which will be described later, frame composition section 116 that composes a frame of a transmission signal and transmission section 117 that performs transmission processing such as quadrature modulation on the transmission signal.

Furthermore, frame composition section 116 includes communication frame composition section 118 that performs frame composition during transmission of user data, empty slot detection section 119 that detects an empty slot that sends no user data, UW frame composition section 120 that performs frame composition during transmission of UW using an empty slot that sends no user data and switch (SW) 121 that selectively outputs the output of communication frame composition section 118 via empty slot detection section 119 or the output of UW frame composition section 120 based on a command from timing control section 114.

Next, the operations of the mobile station apparatus and the base station apparatus that carries out a radio communication with this mobile station apparatus with the above configurations will be explained. In base station apparatus 101, a radio signal sent from mobile station apparatus 110 is input to reception section 104 via antenna 102 and switching section 103, subjected to reception processing such as quasi-coherent detection by reception section 104 and output to demodulation section 105.

Demodulation section 105 performs demodulation processing on the reception signal. At this time, demodulation section 105 performs demodulation while estimating a characteristic of the propagation environment at that time using UW in the demodulated reception data and compensating influences from this propagation environment. Moreover, demodulation section 105 sends the estimation result of the propagation environment characteristic to pre-coding section 108.

Furthermore, in base station apparatus 101, a frame is generated for a transmission signal by frame composition section 107, multiplied by an inverse characteristic of the propagation environment estimated by demodulation section 105 by pre-coding section 108 beforehand, led to transmission section 109, subjected to transmission processing such as quadrature modulation by transmission section 109, passed through switching section 103 controlled by timing control section 106 and transmitted from antenna 102.

On the other hand, in mobile station apparatus 110, a radio signal from base station apparatus 101 is received via antenna 111, switching section 112 and reception section 113.

In mobile station apparatus 110, the reception signal is subjected to reception processing such as quasi-coherent detection and led to demodulation section 114. Demodulation section 114 performs demodulation processing such as coherent detection on the reception signal.

Moreover, in mobile station apparatus 110, a transmission signal is generated by frame composition section 116 controlled by timing control section 115. The frame composition of the transmission signal is changed according to the communication situation.

A frame for user data to be sent is composed by communication frame composition section 118, led to transmission section 117 via empty slot detection section 119 and switch 121. When empty slot detection section 119 detects an empty slot that sends no user data, that information is sent to timing control section 115, switch 121 is changed by timing control section 115 and the output of UW frame composition section 120 is led to transmission section 117.

The transmission signal generated is led to transmission section 117, subjected to transmission processing such as quadrature modulation by transmission section 117, passed through switching section 112 controlled by timing control section 115 and transmitted from antenna 111.

The method of composing a frame by frame composition section 116 of mobile station apparatus 110 will be explained in detail below. A transmission signal of mobile station apparatus 110 of this embodiment has a frame composition as shown in FIG. 2.

FIG. 2A is a schematic diagram showing a frame composition during normal operation, that is, when user data is transmitted and FIG. 2B is a schematic diagram showing a frame composition when UW is transmitted using an empty transmission slot (hereinafter simply referred to as "during UW transmission") without transmitting user data. During UW transmission, UW is transmitted using the entire empty slot capacity as shown in FIG. 2B.

In mobile station apparatus 110, communication frame composition section 118 composes a frame during transmission of user data shown in FIG. 2A and UW frame composition section 120 composes a frame during UW transmission shown in FIG. 2B.

Empty slot detection section 119 distinguishes between a time during which user data is transmitted and a time during which user data is not transmitted and in the case where it is decided that there is no user data assigned to a transmission slot, empty slot detection section 119 switches switch 121 and transmits the frame shown in FIG. 2B composed by UW frame composition section 120.

The following explanation using FIG. 3 describes how UW is transmitted using an empty transmission slot. FIGl.3 is a schematic diagram of transmission/reception statuses showing base station apparatus 101 and mobile station apparatus 110 carrying out a radio communication, where a transmission signal from base-station apparatus 101 to mobile station apparatus 110 has more data and transmission from mobile station apparatus 110 to base station apparatus 101 is carried out at larger intervals.

Here, as detailed below, suppose a case where one of two transmission slots of a transmission signal from the mobile station apparatus to the base station apparatus is an empty slot with no user data to be transmitted.

MS transmission signal ① from mobile station apparatus 110 is a transmission signal including user data and has a frame composition created by communication frame composition section 118 as shown in FIG. 2A. In base station apparatus 101 that receives this transmission signal, demodulation section 105 estimates the propagation environment characteristic using UW contained in MS transmission signal ① and demodulates the reception signal while compensating the propagation environment characteristic.

Next, in base station apparatus 101, based on the propagation environment characteristic estimated from the UW of MS transmission signal ① by demodulation section 105, pre-coding section 108 performs pre-coding on the transmission signal and sends it as BS transmission signal ②. BS transmission signal ② includes user data and its frame composition is the same as the composition shown in FIG. 2A.

Then, since mobile station apparatus 110 has an empty slot with no user data to be sent, empty slot detection section 119 that detects the empty slot notifies it to timing control section 115 and timing control section 115 switches switch 121 and transmits UW transmission signal ③ having the frame composition as shown in FIG. 2B created by UW frame composition section 120.

Next, in base station apparatus 101, based on the propagation environment characteristic estimated from the UW in UW transmission signal ③ by demodulation section 105, pre-coding section 108 performs pre-coding on the transmission signal and sends it as BS transmission signal ④. BS transmission signal ④ includes user data and its frame composition is the same as the composition as shown in FIG. 2A.

Thus, according to this embodiment, when there is an empty transmission slot with no user data to be transmitted assigned, UW is sent using this empty transmission slot, and therefore in the case of an asymmetric communication whose DL duration is longer than UL duration or in the case of a symmetric communication with a large interval of switching between UL and DL, it is possible to perform pre-coding capable of keeping up with an ever-changing variation in the propagation environment.

(Embodiment 2)

Figure 4:
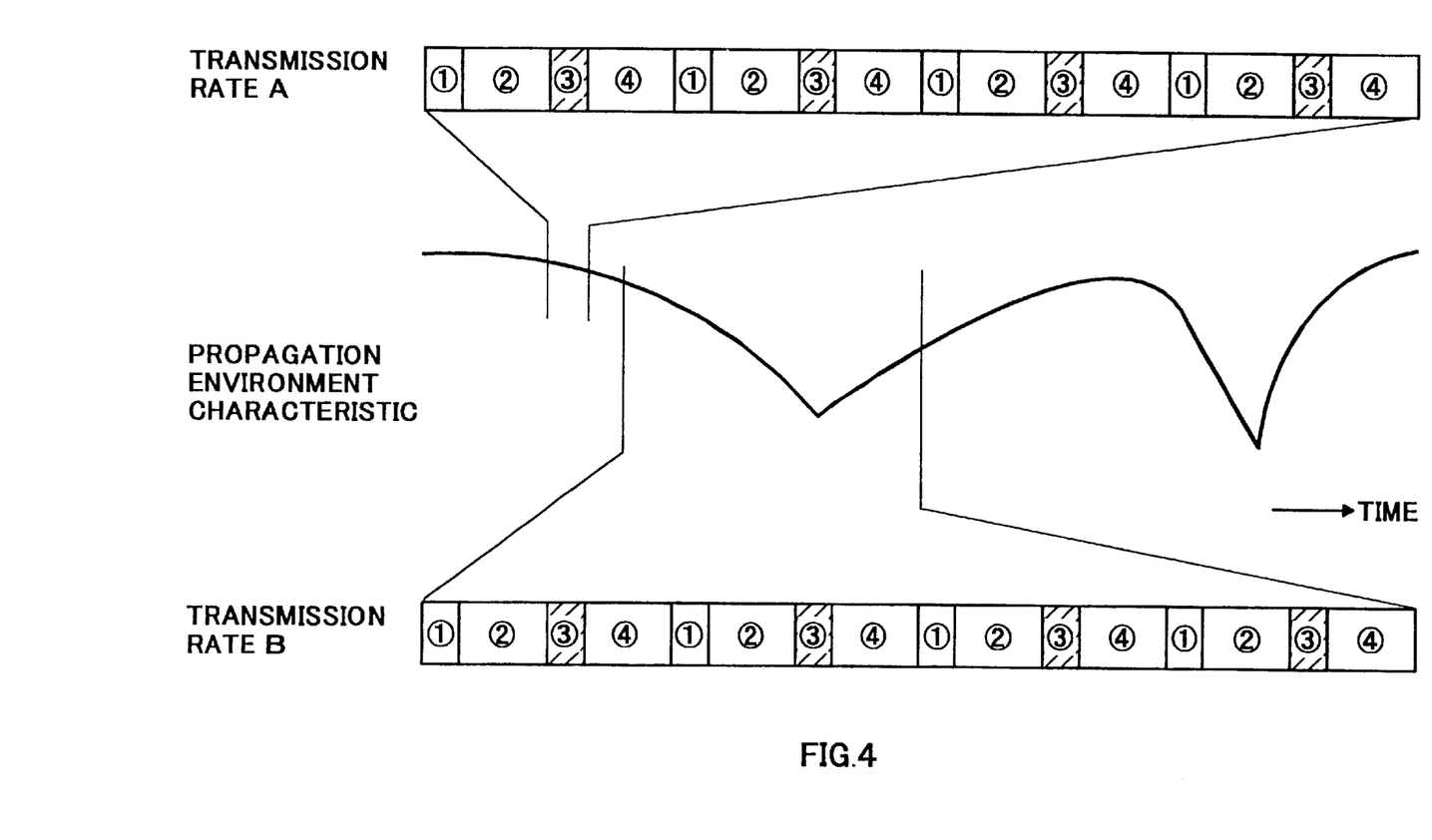
FIG. 4 is a schematic diagram showing an example of propagation environment and frame compositions of two communications with different transmission rates.

This embodiment describes a case where timing of sending UW is changed according to a transmission rate. Suppose a state as shown in FIG. 4. Suppose a communication is being carried out at transmission rate A and transmission rate B under a propagation environment characteristic shown in the figure. The interval at which an empty transmission slot (here slot ③) is generated is assumed to be once for every 4 slots for transmission and reception combined as in the case of FIG. 3.

Here, suppose the UW transmission timing is fixed. In a communication at transmission rate A and a communication at transmission rate B, which is slower than transmission rate A, if UW is sent at a rate, for example, once every two empty transmission slots at the same timing, the communication at transmission rate A, which is sufficiently fast, can reflect a variation in the propagation environment, while the communication at transmission rate B cannot keep up with a variation in the propagation environment, unable to correctly estimate the propagation environment.

Thus, this embodiment decides a transmission rate for every communication and changes the timing of transmitting UW according to this decided transmission rate.

Figure 5:
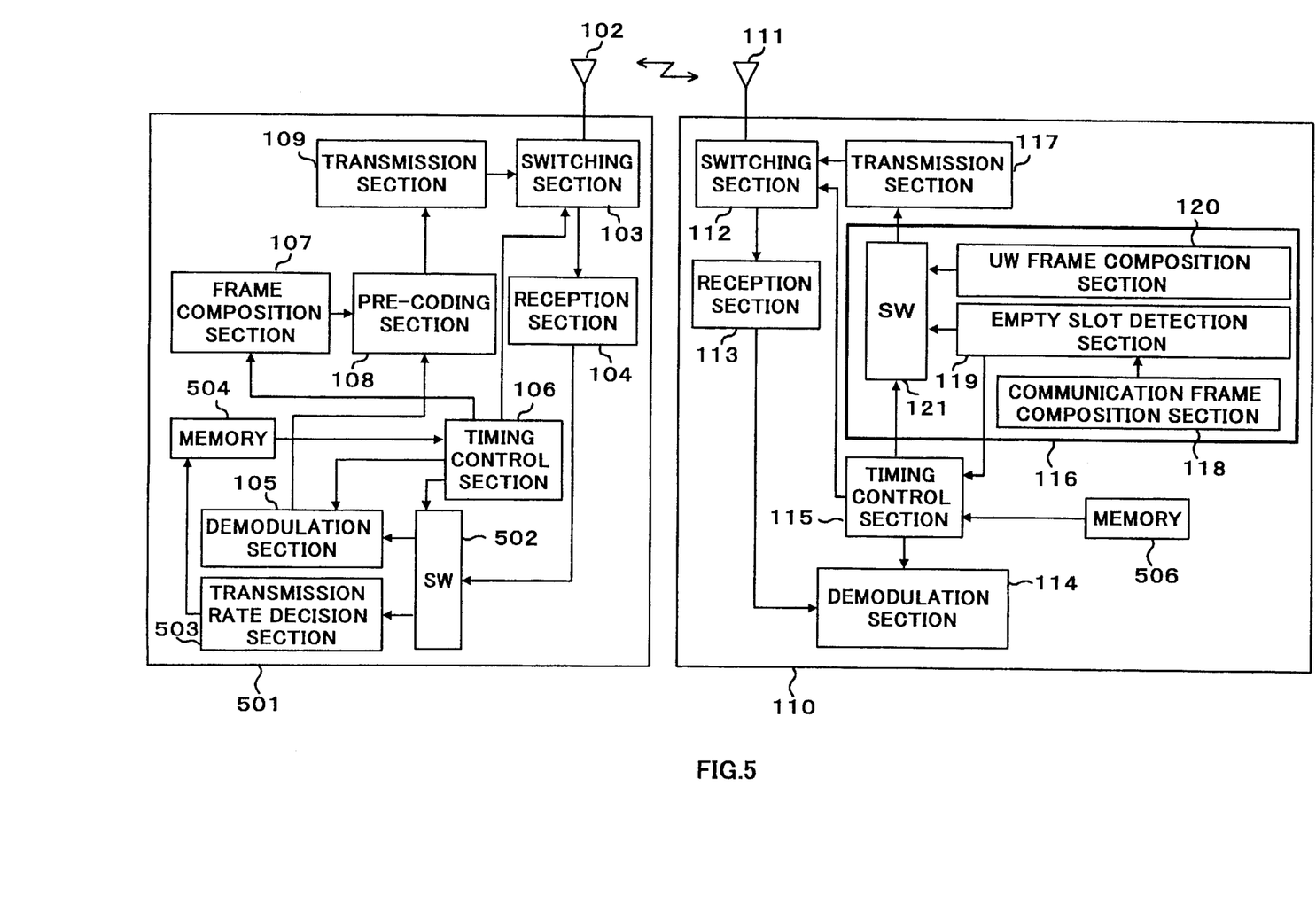
FIG. 5 is a block diagram showing an outlined configuration of a base station apparatus and mobile station apparatus according to Embodiment 2 of the present invention.

The radio communication apparatus according to this embodiment will be explained using FIG. 5 below. FIG. 5 is a main block diagram showing an outlined configuration of a base station apparatus and mobile station apparatus according to Embodiment 2 of the present invention. In FIG. 5, the parts with the same configuration as that in FIG. 1 are assigned the same reference numerals as those in FIG. 1 and their detailed explanations will be omitted.

In FIG. 5, base station apparatus 501 adopts a configuration of base station apparatus 101 in FIG. 1 plus switch 502 that outputs a reception signal to demodulation section 105 or transmission rate decision section 503, which will be described later, based on the timing controlled by timing control section 106, transmission rate decision section 503 that decides the transmission rate of the reception signal and memory 504 that stores the transmission rate of the reception signal detected by transmission rate decision section 503.

On the other hand, in FIG. 5, mobile station apparatus 505 adopts a configuration of mobile station apparatus 110 in FIG. 1 plus memory 506 that stores an arbitrarily set transmission rate. This stored transmission rate can be provided specifically, for example, for every terminal or several kinds of rate can be provided for every terminal and can be selected by the user.

Then, the operations of the base station apparatus and mobile station apparatus configured as shown above will be explained. In mobile station apparatus 505, timing control section 115 switches switch 121 at a timing based on a transmission rate stored in memory 506 specific to the terminal or according to selection by the user and transmits a transmission signal having a frame as shown in FIG. 2B, which is the output of UW frame composition section 120.

On the other hand, in base station apparatus 501, a reception signal is input to transmission rate decision section 503 via switch section 103 controlled by timing control section 106, reception section 104 and switch 502.

For the reception signal, the transmission rate of the other end of communication at that time is decided by transmission rate decision section 503 and the decided transmission rate is stored in memory 504. Hereafter, timing control section 106 controls the switching timing of switching section 103, demodulation timing of demodulation section 105 and frame composition of frame composition section 107 based on the transmission rate stored in memory 504.

As shown above, this embodiment can change the timing of transmitting UW according to the transmission rate, and thus can estimate a propagation environment appropriately.

(Embodiment 3)

This embodiment describes a case where an algorithm actually used for every arbitrary frame is reset from among a plurality of algorithms to estimate a propagation environment from the received UW.

The apparatus according to this embodiment will be explained using FIG. 6 and FIG. 7 below.

Figure 6:
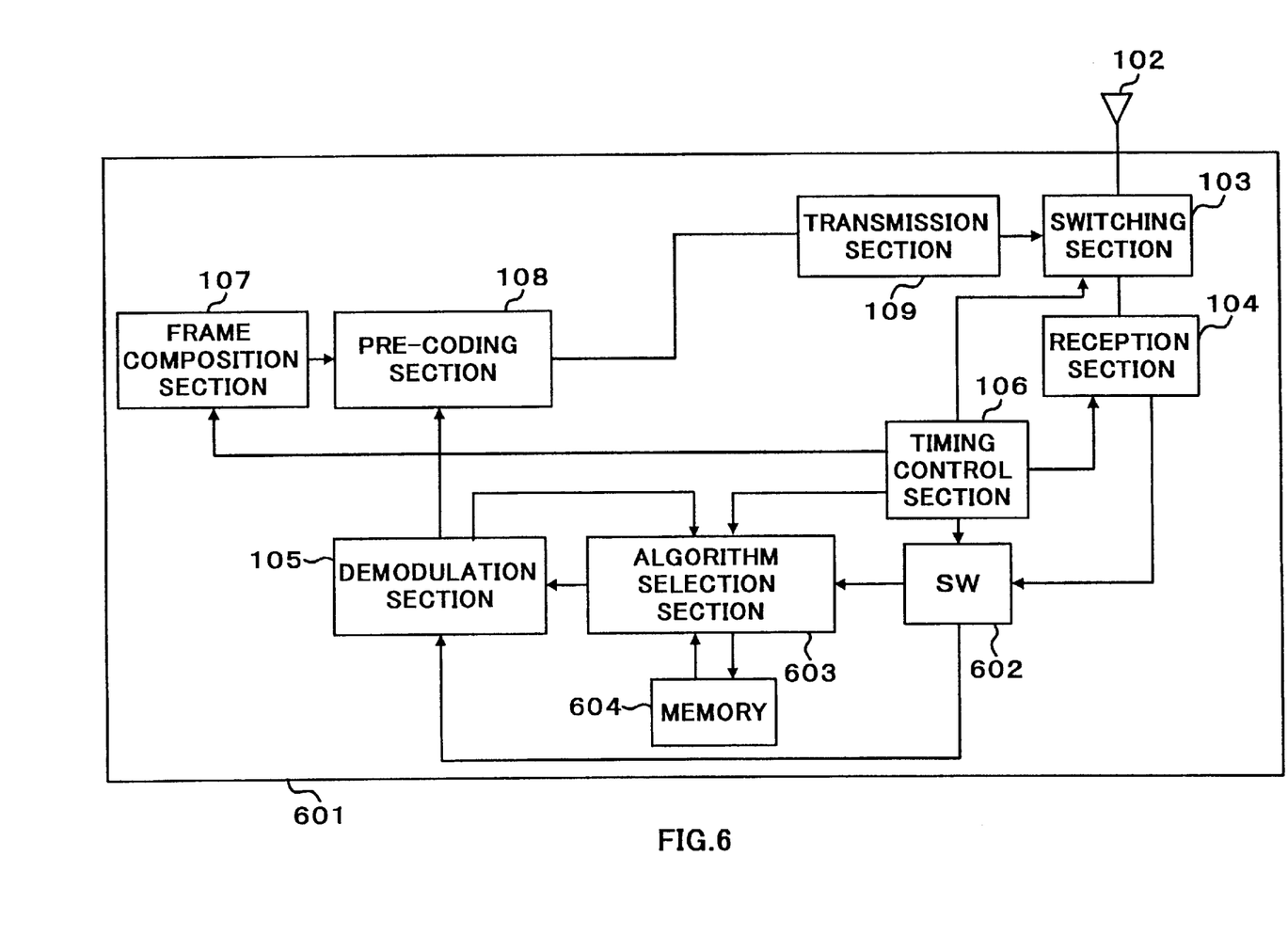
FIG. 6 is a block diagram showing an outlined configuration of a base station apparatus according to Embodiment 3 of the present invention.
Figure 7:
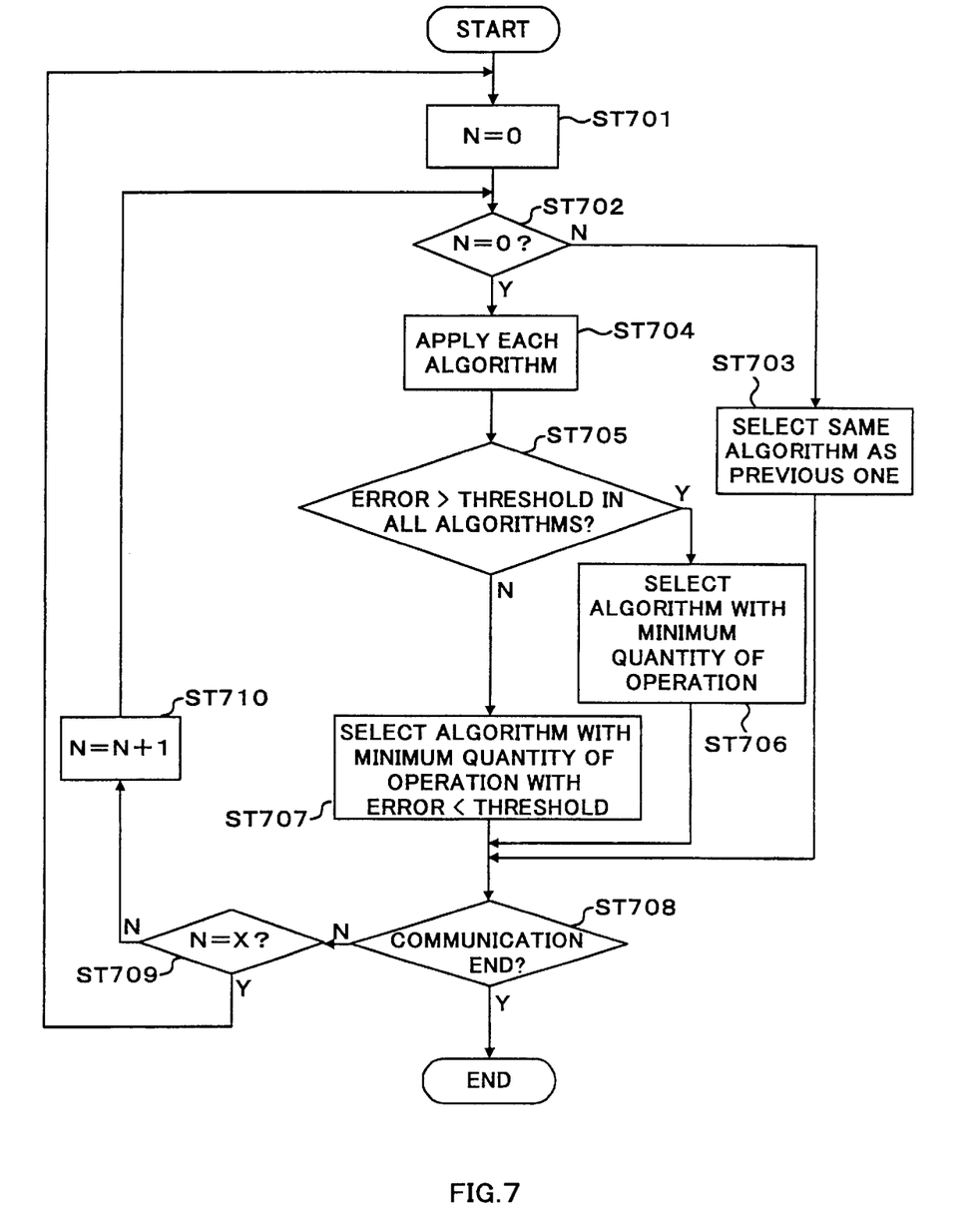
FIG. 7 is a flow chart showing a procedure for setting a propagation environment estimation algorithm in the base station apparatus according to Embodiment 3 of the present invention.

FIG. 6 is a main block diagram showing an outlined configuration of a base station apparatus according to Embodiment 3 of the present invention. FIG. 7 is a flow chart showing a procedure of setting a propagation environment estimation algorithm in the base station apparatus according to Embodiment 3 of the present invention. The parts with the same configuration as that in FIG. 1 are assigned the same reference numerals and ≠X in ST 709, in ST 710, the process returns to ST 702 after N is incremented by 1 in ST 710, further moves forward to ST 703 and then the same algorithm is used until X frames pass.

Furthermore, if N=X in ST 709, it is decided to be the timing for resetting and the process returns to ST 701 where an algorithm is selected again.

As shown above, according to this embodiment, an algorithm for estimating a propagation environment is reset every time a predetermined number of frames pass, thus making it possible to appropriately estimate the propagation environment.

(Embodiment 4)

This embodiment uses the same algorithm as the previous one in the case where demodulation error information is equal to or smaller than a threshold.

Figure 8:
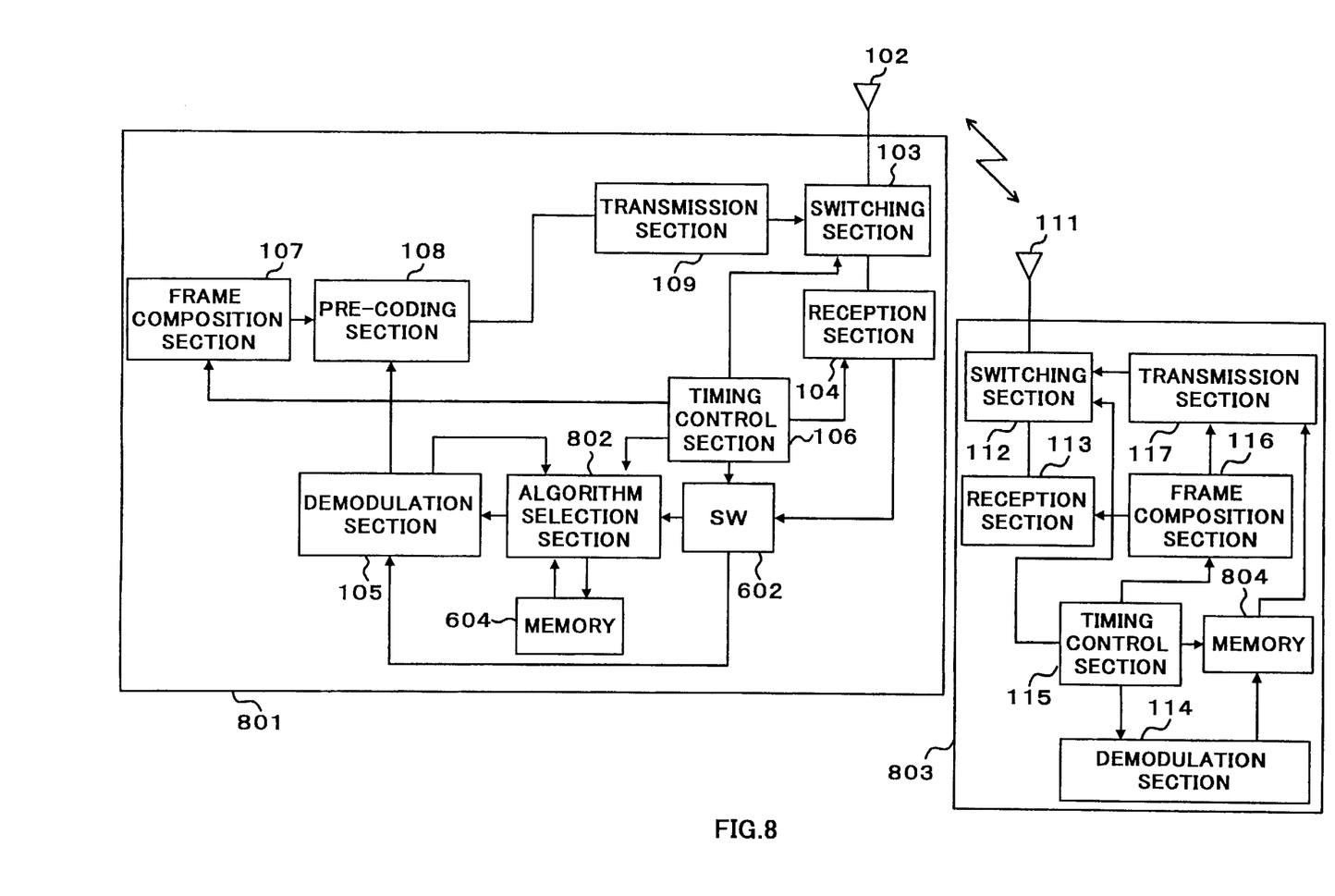
FIG. 8 is a block diagram showing an outlined configuration of a base station apparatus and mobile station apparatus according to Embodiment 4 of the present invention.
Figure 9:
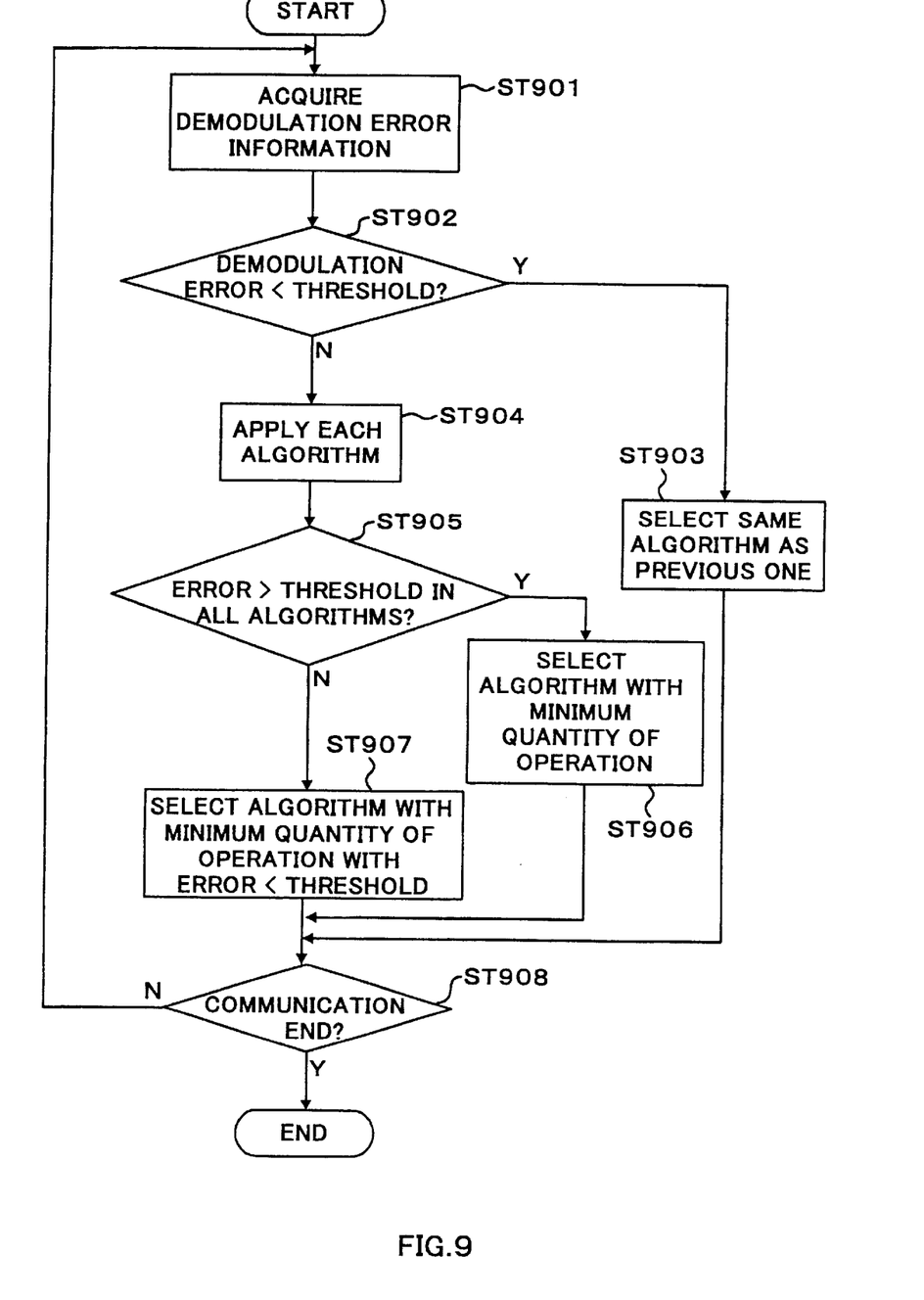
FIG. 9 is a flow chart showing a procedure for setting a propagation environment estimation algorithm in the base station apparatus according to Embodiment 4 of the present invention.

A base station apparatus according to this embodiment will be explained using FIG. 8 and FIG. 9. FIG. 8 is a main block diagram showing an outlined configuration of the base station apparatus and mobile station apparatus according to Embodiment 4 of the present invention and FIG. 9 is a flow chart showing a procedure for setting a propagation environment estimation algorithm in the base station apparatus according to Embodiment 4 of the present invention. The parts with the same configuration as those in FIG. 1 and FIG. 3 are assigned the same reference numerals and their detailed explanations will be omitted. their detailed explanations will be omitted.

Base station apparatus 601 comprises switch 602 that outputs the output of reception section 104 to algorithm selection section 603, which will be described later, or demodulation section 105 based on the control of timing control section 106, algorithm selection section 603 that selects a propagation environment estimation algorithm to be applied to an input reception signal and memory 604 that stores a plurality of algorithms to estimate a propagation environment from the received UW and is read by algorithm selection section 603.

Then, the method of setting a propagation environment estimation algorithm in base station apparatus 601 with the above configuration will be explained using the flow chart in FIG. 7. Here, suppose memory 604 has n algorithms and resets an algorithm for every X frames.

When a communication is started, N=0 is set as an initial value in step (hereinafter referred to as "ST") 701. Then, in ST 702, timing control section 106 decides whether N is 0 or not, that is, whether it is time to reset an algorithm or not.

If N≠0 in ST 702, it is decided that the number of frames for resetting an algorithm is not reached and the process moves forward to ST 703 where switch 602 that has received a command from timing control section 106 outputs the reception signal to demodulation section 105 and algorithm selection section 603 selects the same algorithm as the previously selected algorithm.

On the other hand, if N=0 in ST 702, the process moves forward to ST 704, switch 602 inputs the reception signal to algorithm selection section 603 according to a command from timing control section 106 and resetting of an algorithm starts.

In ST 704, algorithm selection section 603 applies the n algorithms stored in memory 604 to the input reception signal individually and simultaneously. Then, in ST 705, errors are calculated when each algorithm is applied and compared with their respective predetermined thresholds.

In ST 705, if no errors have fallen below the thresholds when the algorithms are applied, the process moves forward to ST 706 where the algorithm with the least amount of operation is selected from among the n algorithms. On the other hand, if at least one error has fallen below its threshold when its algorithm is applied in ST 705, the process moves forward to ST 707 and the algorithm with the least amount of operation is selected from among the algorithms whose errors have fallen below the thresholds when the algorithms are applied.

Then, after the algorithm is selected, if it is confirmed that the communication is not completed in ST 708, it is decided in ST 709 whether resetting of an algorithm has been examined for X frames or not. Here, since an algorithm is reset for every X frames, if N In FIG. 8, base station apparatus 801 includes algorithm selection section 802 that selects an algorithm taking into account error information sent from the mobile station apparatus, which will be described later, and mobile station apparatus 803 includes memory 804 that stores a demodulation error detected using UW in a reception signal when demodulation section 114 is performing demodulation processing such as coherent detection.

Next, the method of setting a propagation environment estimation algorithm in base station apparatus 801 with the above configuration will be explained using the flow chart in FIG. 9. Here, suppose memory 604 has n algorithms and an algorithm is reset when demodulation error information sent from the mobile station apparatus exceeds a threshold.

When a communication is started, the demodulation error information read and sent from memory 804 by the mobile station apparatus is input to algorithm selection section 802 in ST 901.

Then, in ST 902, algorithm selection section 802 compares the demodulation error information sent from the mobile station apparatus with a preset arbitrary threshold. If the demodulation error information is smaller than the threshold, it is decided that the channel quality is good and the process moves forward to ST 903 where the same algorithm as the previous one is selected. On the other hand, if the demodulation error information is larger than the threshold, it is decided that the channel quality is not good and the algorithm is reset.

In the following processes ST 904 to ST 907, an algorithm is selected. The processes from ST 904 to ST 907 are the same as ST 704 to ST 707 in the flow chart shown in FIG. 7, and therefore their explanations will be omitted.

In this way, when an algorithm is selected, it is decided in ST 908 whether a communication is continued or not, and if a communication is continued, the process goes back to ST 901 where demodulation error information sent from the mobile station apparatus is acquired again.

As shown above, according to this embodiment, an algorithm to estimate the propagation environment is reset as appropriate based on the size of the demodulation error in the mobile station apparatus, and therefore it is possible to estimate the propagation environment appropriately.

The radio communication apparatus according to aspect 1 of the present invention adopts a configuration comprising a detector that detects one unit time during which no user data is sent to the other communication station, a control signal transmitter that sends a control signal using the detected one unit time to the other communication station and a receiver that receives a signal sent by the other communication station with a propagation environment characteristic compensated based on the control signal.

According to this configuration, in the case of an asymmetric communication where reception lasts longer than transmission or in the case of a symmetric communication with a long interval between transmission and reception, the radio communication apparatus with less data to be transmitted transmits a control signal using an empty slot, and so the other communication station can estimate the propagation environment accurately and perform appropriate precoding.

The radio communication apparatus according to Aspect 2 of the present invention adopts a configuration with the control signal transmitter in Aspect 1 further comprising a transmission rate detection section that detects the current transmission rate and a timing control section that controls the timing of transmitting the control signal based on this detected transmission rate.

The radio communication apparatus according to Aspect 3 of the present invention adopts a configuration with the control signal transmitter in Aspect 2 reducing the frequency of transmitting the control signal when the transmission rate increases and increasing the frequency of transmitting the control signal when the transmission rate decreases.

These configurations change the timing of transmitting a control signal according to the transmission rate, and therefore the other communication station can estimate the propagation environment accurately.

The radio communication apparatus according to Aspect 4 of the present invention adopts a configuration comprising a storage device that stores a plurality of analysis programs to estimate a propagation environment characteristic based on a control signal received from the other communication station, a program setting device that resets the analysis programs at an arbitrary time interval and a transmitter that transmits a signal with the estimated propagation environment characteristic compensated.

This configuration resets the analysis programs at an arbitrary timing and selects a program with the least possible quantity of operation according to the channel quality at that time, thus making it possible to reduce the quantity of operation necessary to estimate the propagation environment.

The radio communication apparatus according to Aspect 5 of the present invention adopts a configuration of Aspect 4 further comprising a comparator that compares a demodulation error detected by the other communication station and an arbitrary threshold and a controller that controls the program setting section so that when the comparison result shows that the demodulation error is smaller than the threshold, the analysis program is not reset.

According to this configuration, when the demodulation error at the other communication station is sufficiently small and the channel quality is decided to be good, the same analysis program currently being used is used, and therefore it is possible to reduce the quantity of operation.

The transmission/reception method according to Aspect 6 of the present invention comprises a detection step of detecting one unit time during which no user data is sent to the other communication station, a control signal transmission step of transmitting a control signal to the other communication station using this detected one unit time and a reception step of receiving a signal sent by the other communication station with a propagation environment characteristic compensated based on the control signal.

According to this method, in the case of an asymmetric communication where reception lasts longer than transmission or in the case of a symmetric communication with a long interval between transmission and reception, the radio communication apparatus with less data to be transmitted transmits a control signal using an empty slot, and therefore the other communication station can estimate the propagation environment accurately and perform appropriate precoding.

The transmission/reception method according to Aspect 7 of the present invention adopts the control signal transmission step in Aspect 6 further comprising a transmission rate detection step of detecting the current transmission rate and a timing control step of controlling the timing of transmitting the control signal based on this detected transmission rate.

The transmission/reception method according to Aspect 8 of the present invention adopts the control signal transmission step in Aspect 7 reducing the frequency of transmitting the control signal when the transmission rate increases and increasing the frequency of transmitting the control signal when the transmission rate decreases.

These methods change the timing of transmitting a control signal according to the transmission rate, and therefore the other communication station can estimate the propagation environment accurately.

The transmission/reception method according to Aspect 9 of the present invention comprises a storage step of storing a plurality of analysis programs to estimate a propagation environment characteristic based on a control signal received from the other communication station, a program setting step of resetting the analysis programs at an arbitrary time interval and a transmitting step of transmitting a signal with the estimated propagation environment characteristic compensated.

This method resets the analysis programs at an arbitrary timing and selects a program with the least possible quantity of operation according to the channel quality at that time, thus making it possible to reduce the quantity of operation necessary to estimate the propagation environment.

The transmission/reception method according to Aspect 10 of the present invention adopts Aspect 9 further comprising a comparison step of comparing a demodulation error detected by the other communication station and an arbitrary threshold and a control step of controlling the program setting section so that when the comparison result shows that the demodulation error is smaller than the arbitrary threshold, the analysis program is not reset.

According to this method, when the demodulation error at the other communication station is sufficiently small and the channel quality is decided to be good, the same analysis program currently being used is used, and therefore it is possible to reduce the quantity of operation.

The apparatuses and methods according to the above embodiments can be applied to a radio base station apparatus and mobile station apparatus in a digital radio communication system.

According to these configurations, in the case of an asymmetric communication whose DL duration is longer than UL duration or in the case of a symmetric communication with a large interval of switching between UL and DL, it is possible to perform pre-coding capable of keeping up with an ever-changing variation in the propagation environment.

As described above, in the case of an asymmetric communication whose DL duration is longer than UL duration or in the case of a symmetric communication with a large interval of switching between UL and DL, the present invention can perform pre-coding capable of keeping up with an ever-changing variation in the propagation environment.

This application is based on the Japanese Patent Application No.HEI 11-15759 filed on Jan. 25, 1999, entire content of which is expressly incorporated by reference herein.

Industrial Applicability

The present invention is applicable to a radio base station apparatus and mobile station apparatus in a digital radio communication system.

What is claimed is:

1. A radio communication apparatus comprising:

a storage section that stores a plurality of analysis programs to estimate a propagation environment characteristic based on a control signal received from the other communication station;

a program setter section that resets said analysis programs at an arbitrary time interval; and a transmission section that transmits a signal with the estimated propagation environment characteristic compensated.

2. The radio communication apparatus according to claim 1, further comprising:

a comparison section that compares a demodulation error detected by said other communication station and an arbitrary threshold; and a control section that controls said program setter section so that when the comparison result shows that said demodulation error is smaller than said threshold, said analysis programs are not reset.

3. A transmission/reception method comprising:

the storing step of storing a plurality of analysis programs to estimate a propagation environment characteristic based on a control signal received from the other communication station;

the program setting step of resetting said analysis programs at an arbitrary time interval; and the transmitting step of transmitting a signal with the estimated propagation environment characteristic compensated.

4. The transmission/reception method according to claim 3, further comprising:

the comparing step of comparing a demodulation error detected by said other communication station and an arbitrary threshold; and the controlling step of controlling said program setting step so that when the comparison result shows that said demodulation error is smaller than said threshold, said analysis program is not reset.

* * * * *